United States Patent [19]

Stratton

[11] 3,902,216

[45] Sept. 2, 1975

[54] ANTI-CREEP WIPER BLADE ELEMENT

[75] Inventor: Donald W. Stratton, Hammond, Ind.

[73] Assignee: The Anderson Company, Gary, Ind.

[22] Filed: Feb. 1, 1973

[21] Appl. No.: 328,646

[52] U.S. Cl. .......................................... 15/250.42
[51] Int. Cl. ........................... B60s 1/04; B60s 1/38
[58] Field of Search........ 15/250.36, 250.42, 250.38

[56] References Cited
UNITED STATES PATENTS

| | | | |
|---|---|---|---|
| 2,907,065 | 10/1959 | Macpherson | 15/250.42 |
| 3,041,654 | 7/1962 | Anderson | 15/250.42 |
| 3,084,372 | 4/1963 | Krohm | 15/250.36 |
| 3,386,123 | 6/1968 | Oishei et al. | 15/250.36 X |
| 3,643,286 | 2/1972 | Wubbe | 15/250.42 X |

FOREIGN PATENTS OR APPLICATIONS 1,088,410  10/1967  United Kingdom............. 15/250.42

Primary Examiner—Peter Feldman
Attorney, Agent, or Firm—Wegner, Stellman, McCord, Wiles & Wood

[57] ABSTRACT

A windshield wiper assembly for a curved windshield including a pressure distributing superstructure having claws adapted to engage a blade structure at longitudinally spaced positions, together with a blade structure including a flexible holder having a pair of laterally opening slots for receiving the claws of the superstructure, and a longitudinal retention chamber for receiving an enlarged retention bead along the upper edge of a resilient wiping member, wherein the wiping member includes groups of contiguous lateral projections which restrict longitudinal movement of the wiping member relative to the flexible holder.

7 Claims, 7 Drawing Figures

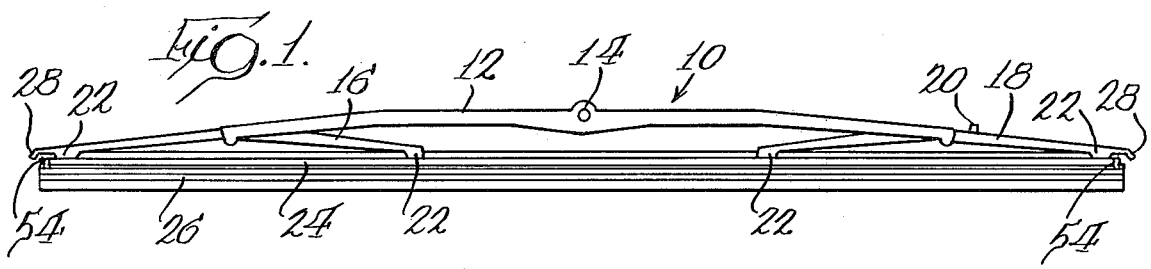
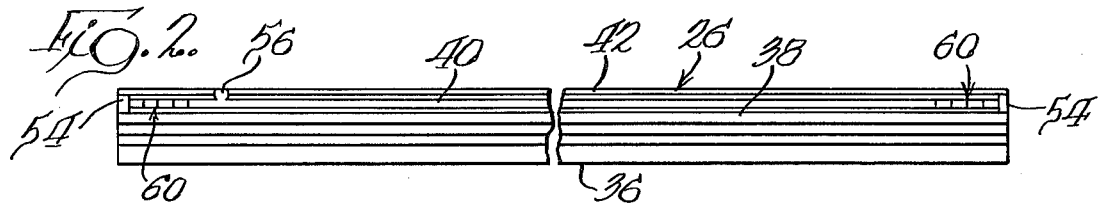
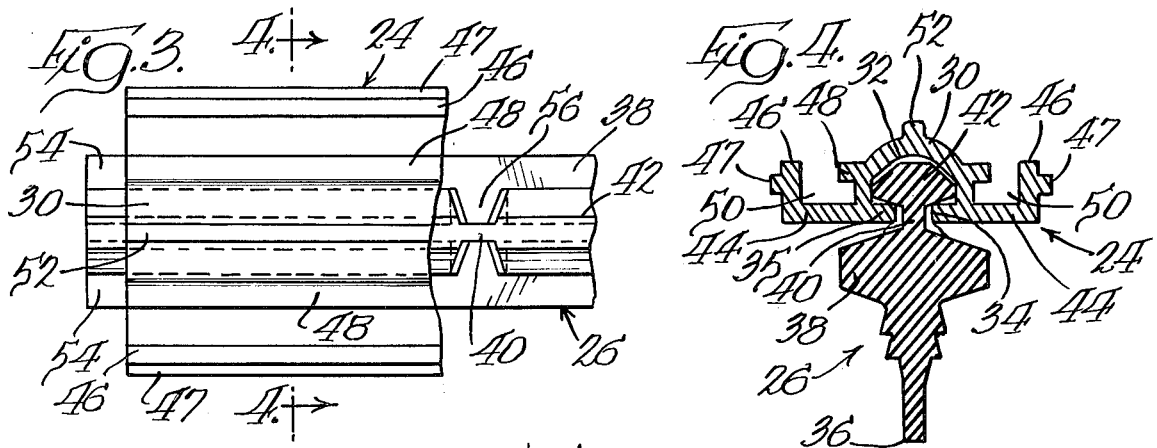
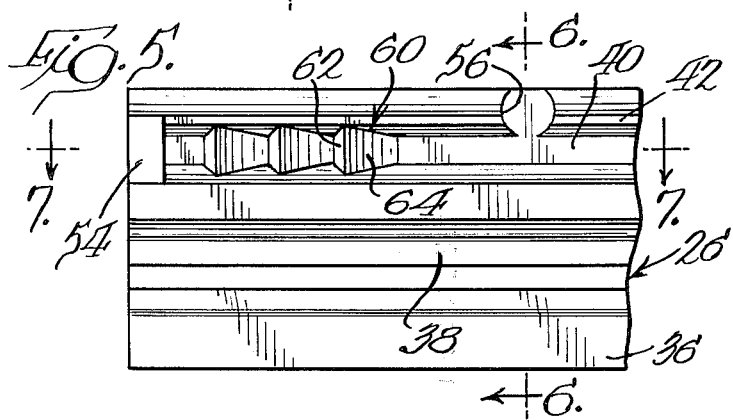
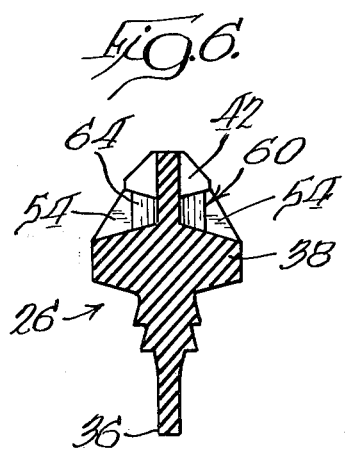
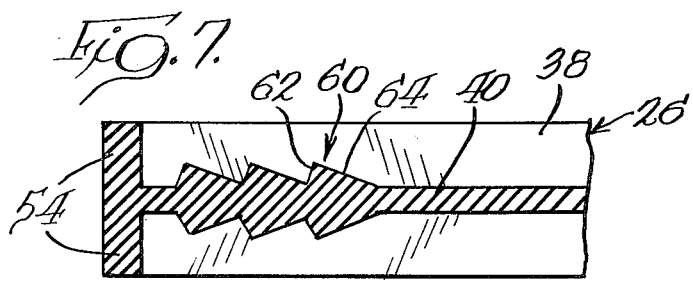

ANTI-CREEP WIPER BLADE ELEMENT

BACKGROUND OF THE INVENTION

The present invention relates to a windshield wiper blade structure including a flexible backing member or holder, sometimes called a flexor, and a resilient wiping member slidably mounted on the backing member in a manner permitting removal of the wiping member for replacement.

In the past, wiper blade structures have included resilient wiping members and flexible backing or reinforcing members embedded therein. However, the wiping member and the backing or reinforcing member when assembled initially or when the resilient wiping member has been replaced have a tendency to shift or creep relative to each other such that the resilient wiping member elongates so that a portion extends beyond the backing member in unsupported and therefore ineffective wiping relationship.

SUMMARY OF THE PRESENT INVENTION

It is a general object of the present invention to provide a new and improved resilient windshield wiping element having a lower wiping edge, a reduced intermediate neck portion, and a relatively thick retention bead along the upper edge positionable in a retention chamber of a backing member, together with abutment means at each end of the wiping element projecting outwardly relative to the reduced neck portion for engaging the ends of the backing member to limit longitudinal movement of the wiping element relative to the backing member.

Another object is to provide a new and improved wiping element which has groups of laterally outwardly extending projection means on the reduced neck portion for engaging the inwardly directed edges of a slot in the backing member to resist and restrict longitudinal creeping of the wiping element relative to the backing member.

A more specific object is to provide a wiper blade structure including a resilient wiping element of the type described above in association with an elongate flexible backing member having a longitudinal slot defining edges or lips which nest in the reduced intermediate neck portion of the wiping element and said backing means having portions for receiving the claws of a superstructure.

In the preferred embodiment illustrated, the projection means on the relatively thin neck portion for limiting creeping movement of the wiper element relative to the backing element comprises a group of contiguous projections on opposite sides of the reduced neck portion near each end of the wiper element.

Preferably, each projection is generally triangular in horizontal cross section, with one surface facing the nearest end of the wiping element extending generally transverse to the element, and another surface facing toward the remote end of the wiping element inclined only slightly relative to the length of the element.

BRIEF DESCRIPTION OF THE DRAWINGS

FIG. 1 is a side elevational view of a windshield wiper apparatus embodying the principles of the present invention;

FIG. 2 is an enlarged fragmentary side elevational view of our improved blade structure, removed from the superstructure illustrated in FIG. 1;

FIG. 3 is an enlarged fragmentary top plan view of the blade structure illustrated in FIG. 2;

FIG. 4 is an enlarged transverse sectional view of the blade structure illustrated in FIG. 3, taken at about the line 4—4;

FIG. 5 is an enlarged fragmentary side elevational view of the wiping element, removed from the backing element;

FIG. 6 is a cross section through the wiping element taken at about the line 6—6 of FIG. 5; and FIG. 7 is a longitudinal sectional view taken at about the line 7—7 of FIG. 5.

DETAILED DESCRIPTION OF PREFERRED EMBODIMENT

Referring now to the drawings in more detail, a superstructure 10 includes a primary yoke member or bridge member 12 having a central portion constructed as at 14 for appropriate attachment to a spring-pressed wiper arm and which superstructure forms no part of the present invention. Opposite ends of the primary yoke member 12 are attached to mid portions of secondary yokes 16 and 18. The superstructure, including the primary yoke 12 and the secondary yokes 16 and 18, may correspond in general with the construction illustrated in prior U.S. Pat. No. 2,897,530 to John W. Anderson. Preferably at least one of the secondary yokes, 18 as shown herein, is releasably attached to the primary yoke 12, and may be readily detached upon depression of a release button illustrated at 20, in the manner described in the last mentioned patent. Opposite ends of the secondary yokes 16 and 18 are formed with claws as at 22 engaging a backing member 24 carrying a wiping member 26. Outboard ends of the secondary yokes 16 and 18 include downwardly turned end portions 28 for limiting longitudinal movement of the backing member 24 relative to the superstructure, thereby to retain the blade structure on the superstructure.

A wiper of the type illustrated is adapted for cleaning curved and flat windshields on automotive vehicles. The superstructure, including pressure-distributing yokes 12, 16 and 18, transmits pressure from a spring-pressed wiper arm to the flexible backing member 24 and wiping member 26. As a result of the pressure distributed through the yokes, the backing member is urged toward the curved windshield, and as the wiper assembly is moved back and forth over the windshield, the wiping member conforms to the constantly changing curvature of the windshield.

The backing member 24 is preferably of extruded flexible plastic material, and includes a central tubular portion 30 having a chamber 32 which functions as a receiver for a retaining bead 42 on the wiping element 26. Preferably, the chamber 32 is somewhat triangular in cross-sectional configuration and a relatively narrow slot 34 opens into the chamber along the bottom of the tubular portion 30 between edges or retention lips 35. The wiping element 26 is preferably made of relatively soft resilient rubber-like material and includes a relatively thin wiping edge 36, a thicker intermediate portion 38, a relatively thin neck portion 40 and an enlarged retention bead 42 along the upper edge. The space between the intermediate portion and the retention portion provides laterally opening grooves which receive the edges or retention lips 35 of the backing member. In use of the invention, the wiping element 26 is attached to the backing member 24 with the retention bead 42 of the wiping element disposed in the receiver chamber 32, and with the relatively thin neck portion 40 of the wiping element disposed in the slot 34. As illustrated, the retention bead 42 has a generally triangular cross section which is complementary to the receiver chamber 32. The wiping element 26 is attached to the backing element 24 by threading the bead 42 into the receiver chamber 32. It is to be understood that the present structure relating to the wiping member 26 can be used with any backing member having a longitudinal slot with edges engaging in the grooves in the sides of the wiping element.

As best understood by reference to FIGS. 3 and 4, the backing member 24 is relatively wide and relatively thin, and includes a pair of opposed rails or flanges 44 extending laterally outwardly in opposite directions from the slot 34 at the bottom of the receiver 30. The structural details and advantages of the illustrated backing member 24 is the subject matter of a copending application Ser. No. 328,649 filed Feb. 1, 1973 in the names of John P. Moorhead & Donald W. Stratton and assigned to the common assignee of this application. In the form of flexor illustruated, each of the flanges 44 is formed along the outside edge with an upwardly directed flange 46 which functions to reinforce or strengthen the flange 44 along the outer edge so as to limit its flexibility in one plane without adversely affecting its flexibility in a plane transverse thereto. As illustrated, each of the flanges 46 includes an outwardly directed reinforcing rib 47 which limits the capacity of the upright flange to bow outwardly. Above the flanges 44, the receiver 30 is formed with outwardly directed flanges 48 which are spaced from the flanges 44 and spaced from the flanges 46 in a manner to form slots 50 for receiving the claws 22 of the secondary yokes 16 and 18. The top of the tubular receiver 30 is formed with a longitudinal reinforcing rib 52 which limits the capacity of the tubular portion to collapse against the retention rib 42 of the flexible wiping member. By virtue of the construction described, the backing member is relatively inflexible in a plane parallel to flanges 44 and 48 and relatively flexible in a direction to conform to the curvature of the windshield.

In assembly of the apparatus as illustrated in FIG. 1, the backing member 24 with attached wiping member 26 is attachable to the secondary yokes 16 and 18 by insertion of the yoke claws 22 into the claw slots 50 at the end of the backing member. The claws fit loosely enough in the slots 50 so that the backing member is slidable relative to the claws to longitudinally position the backing member properly relative to the superstructure. When the backing member and the wiping member are positioned as illustrated in FIG. 1, the downwardly directed end portions 28 on the yokes 16 and 18 limit longitudinal movement of the backing member relative to the secondary yokes and prevent accidental removal of the backing member from the superstructure. Assembly of the apparatus is facilitated by disconnecting the secondary yoke 18 from the primary yoke 12, so that the secondary yoke 16 may be assembled on the backing member from the left end as viewed in FIG. 1, and the secondary yoke 18 may be assembled on the backing member from the right end as viewed in FIG. 1, after which the secondary yoke 18 is again attached to the end of the primary yoke 12.

The wiping member 26 can be assembled with the backing member 24 by sliding the retention bead 42 into the end of the receiver chamber 32, while the relatively thin neck portion 40 of the wiping member is inserted into the slot 34 in the bottom of the receiver. Means is provided for releasably retaining the wiping member against substantial longitudinal movement relative to the backing member so that the parts do not become disassembled unintentionally. As illustrated herein, the wiping element 26 is formed at opposite ends with an abutment or stop portion 54 extending outwardly at each side of the reduced neck portion 40 between the intermediate body portion 38 and the enlarged bead 42 and adapted to engage the ends of the receiver lips 35. By virtue of the abutments 54 at each end of the wiping member, the wiping member is retained against significant unintentional longitudinal displacement relative to the backing member.

One way to facilitate insertion of the wiping member into the backing member despite the abutments 54 at opposite ends, the retention bead 42 is omitted for a short length adjacent one or both ends to form a gap as illustrated at 56. In assembly, the end portion of the wiping element adjacent the stop 54 illustrated in FIG. 3 is bent downwardly to expose the end of the retention bead 42 at the right edge of the gap 56, so that the bead may be inserted in the right end of the receiver chamber 32 and moved toward the left to the position illustrated in FIG. 3. At this time, the left end portion of the wiper member 26 may be resiliently stretched to insert the remaining end portion of the bead 42, at the left of gap 56, into the left end of the receiver chamber 32. Now, when the stretched wiping element is released, it retracts to the position shown in FIG. 3. The wiping element may be removed from the backing member by reversing the procedure.

In order to limit creepage of opposite ends of the wiping element away from the mid portion of the backing element, as may occur sometimes due to the soft resilient nature of the material of the wiping element and the reaction of such element against a windshield, the wiping element is provided with laterally outwardly extending projections 60 at opposite sides of the reduced neck portion 40 adjacent stops 54 at opposite ends of the wiping element. As illustrated herein, the projections 60 are arranged in groups of three at each side of the neck portion 40 near the opposite ends thereof. It is anticipated that fewer or more projections 60 could be utilized, but the three contiguous projections have worked most successfully. As seen best in FIG. 7, each of the projections 60 has a generally triangular configuration in horizontal cross section and includes an end surface 62 which faces toward the adjacent stop 54 and extends generally transverse to the length of the wiping element. A second surface 64 is disposed approximately at right angles to the surface 62 and is inclined only slightly relatively to the length of the wiping element. The end of the surface 62 of one projection 60 substantially touches the end of the second surface 62 of the contiguous or adjacent projection 60. The shape of the projections 60 is calculated so that they extend outwardly to engage the retention lips 35 on the backing member 24 and are somewhat compressed thereby. The relationship of the surfaces 62 and 64 is such that the projections function somewhat like one-way clutch teeth which permit longitudinal movement of the abutments toward the mid portion of the blade structure and restrict creepage outwardly toward the end of the blade structure. By virtue of the cooperating action of the stop abutments 54 and the projections 60, the end portions of the wiper element are held against movement in opposite directions relative to the end of the backing member 24.

I claim:

1. A windshield wiper element, comprising an elongate strip of rubber-like material having
   a. a relatively thin wiping edge,
   b. a relatively thick intermediate body portion,
   c. a relatively thin neck portion above the intermediate portion,
   d. a relatively thick retention bead along the upper edge,
   e. said relatively thick intermediate body portion and retention bead forming laterally opening grooves for receiving retention lips on a backing member when the retention bead is threaded into a retention chamber in the backing member,
   f. laterally outwardly extending projection means in said grooves spaced from at least one end of the strip for engaging said retention lips of said backing member to restrict longitudinal creeping of the wiper element in the holding element,
   g. said projection means comprising a group of closely spaced contiguous projections in each groove,
   h. each said projection being generally triangular in horizontal cross section with one surface facing the nearest end of the wiping element extending generally transverse to the groove and another surface facing toward the remote end of the wiping element inclined only slightly relative to the base of the groove, the end of the one surface of one projection substantially touching the end of another surface of the adjacent projection and
   i. means at each end of the wiping element for holding said backing member assembled with said wiping element.

2. A windshield wiper element as defined in claim 1, wherein said last-named means is a stop at each end of each of said grooves extending laterally from the reduced neck portion into the adjacent groove, and means near one end of the wiper element and backing member for assembling said wiper element to said backing member.

3. A windshield wiper blade having a wiper member and a backing member operatively assembled together, said wiper member comprising an elongate body of soft resilient material having,
   a. a wiper edge,
   b. a relatively thick intermediate portion,
   c. a relatively thin neck portion above the intermediate portion,
   d. a relatively thick retention bead along the upper edge of said neck portion, said retention bead being spaced from said intermediate portion by said thin neck portion to define a pair of oppositely facing grooves in said wiper member,
   e. at least two contiguous projection means at at least one end portion of the wiper member extending from said neck portion into said grooves, one end of one said projections substantially touching the end of the immediately adjacent projection,
   f. said backing member having a pair of spaced apart planar elements flexible in a plane perpendicular to a surface to be wiped and substantially inflexible in a plane substantially parallel to said surface, and
   g. said spaced apart elements having continuous straight uninterrupted inwardly facing edges nesting in said grooves in engaging relationship with said projection means whereby the contact between said projection means and said facing edges of the backing member restricts longitudinal movement between said wiper member and said backing member.

4. A windshield wiper blade as defined in claim 3, wherein stop means project laterally outwardly into the grooves from the end portions of the reduced neck portion for limiting movement of said backing member relative to said wiper member in one direction.

5. A windshield wiper blade as defined in claim 4, wherein said projection means are compressible and extend laterally outwardly from the neck portion at a position in close proximity to the stop means to resist longitudinal movement of the wiper member relative to the backing member in a direction opposite to the direction of movement limited by said stop means.

6. A windshield wiper blade structure adapted for use with a curved windshield, comprising,
   a. an elongate flexible backing member having a longitudinal retention chamber, straight, continuous, uninterrupted retention edges defining a slot opening into the retention chamber along the bottom of the backing member and laterally outwardly opening grooves on the outside of the backing member for receiving claws of a super-structure;
   b. a resilient wiping element having a lower wiping edge, a reduced neck portion positionable in the slot in the backing member between the retention edges and a relatively thick retention bead along the upper edge positionable in the retention chamber,
   c. laterally outwardly extending projection means on said reduced neck portion spaced from at least one end of the wiping member engaging the retention edges of the backing member to restrict longitudinal creeping of the wiping member relative to the backing member,
   d. said projection means comprising a series of projections on opposite sides of the reduced neck portion near each end of the wiper element, each projection in each series of projections substantially touching the adjacent projection and
   e. abutment means at each end of the wiping member projecting outwardly from the reduced neck portion to engage opposite ends of the backing member to limit longitudinal movement of the wiping member relative to the backing member.

7. A windshield wiper blade structure as defined in claim 6, wherein each projection is generally triangular in horizontal cross section with one surface facing the nearest end of the wiping element extending generally transverse to the base of the reduced neck portion and another surface facing toward the remote end of the wiping element inclined only slightly relative to the base of the reduced neck portion.

* * * * *